T. W. PAGE & M. HOFFMAN.
STALK-CUTTER.
No. 179,338.   Patented June 27, 1876.
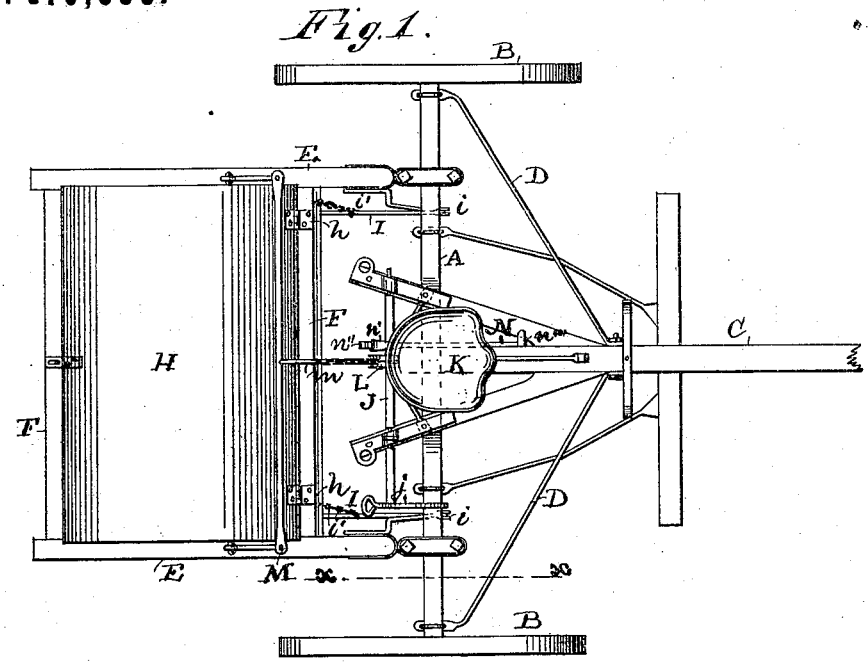
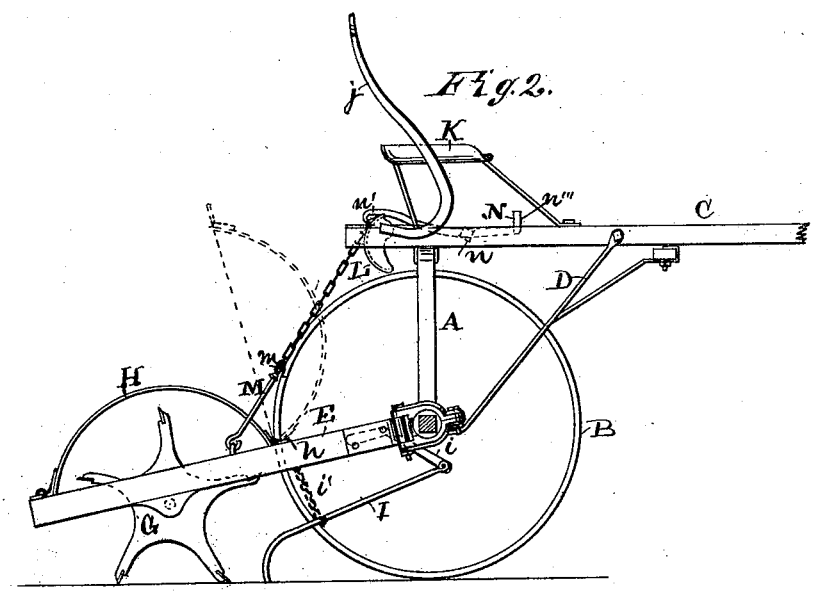

UNITED STATES PATENT OFFICE.

THOMAS W. PAGE AND MARTIN HOFFMAN, OF CANTON, ILLINOIS, ASSIGNORS OF ONE-FOURTH OF THEIR RIGHT TO WILLIAM BABCOCK, SR., OF SAME PLACE.

IMPROVEMENT IN STALK-CUTTERS.

Specification forming part of Letters Patent No. 179,338, dated June 27, 1876; application filed February 23, 1876.

*To all whom it may concern:*

Be it known that we, THOMAS W. PAGE and MARTIN HOFFMAN, of Canton, county of Fulton, and State of Illinois, have invented certain new and useful Improvements in Stalk-Cutters, of which the following is a full, clear, and exact description, such as will enable others skilled in the art to which it pertains to make and use it, reference being had to the accompanying drawings, which form part of this specification, and in which—

Figure 1 is a top view of a machine embodying our invention, and Fig. 2 is a sectional view of Fig. 1 on the line $x\ x$.

The nature of our invention relates to improvements in machines for cutting corn or cotton stalks in the field into short lengths, to facilitate plowing them under, or for other purposes; and the invention consists in the arrangement of devices for suspending the cutter-frame on the wheel-frame, as hereinafter fully described.

Referring to the parts by letters, A represents the axle; B B, the wheels; C, the tongue, and D the braces of the wheel-frame—a frame also adapted to receive cultivator-plows for the purposes of a straddle-row cultivator. E E are the side bars, and F F the transverse bars, of the cutter-frame. G is the cylinder of cutters, journaled in the side bars E. H is a light cover, hinged at $h\ h$ to the forward bar F, and provided with a suitable fastening at its other side and to the rear bar F. I I are the drag-hooks, hinged to the forward ends of arms $i$, and connected by cords or chains $i'$ to the bar F, so that they may reach the ground in operation, and be elevated with the cutter-frame when not in operation. J is a rock-shaft, journaled on the rear end of the hounds, and provided with a hand-lever, $j$, by which it may be operated by the driver from his seat K on the wheel-frame. L is a curved arm centrally on the shaft J, and has a chain, $l$, attached at its forward part, and, extending back over its grooved surface, is connected at its other end to a hook, $m$, which is connected to a bail, M, the ends of which are hinged to the side frame-bars E. N is a foot-lever, pivoted at $n$ to the side of the tongue C, its forward end formed as shown in the drawings at $n'''$, to receive the driver's foot, and its rear end formed into a hook-pawl, $n'$, which engages with a ratchet, $n''$, on the shaft J.

The operation is as follows: The process of cutting is in the ordinary manner. When it is desired to raise and support the cutter-frame for temporary transportation, the lever $j$ may be used to rotate the rock-shaft J, and thus turn the arm L, and draw up the chain or cord $l$, and raise the cutter-frame and cylinder of cutters from the ground; and on their jointed connection to the wheel-frame as a fulcrum, the pawl $n'$, engaging with the ratchet $n''$, will sustain it elevated until the driver, by pressing with his foot on the forward end of the lever N, disengages the pawl $n'$, and allows the cutter-frame to fall easily by means of his hand utilizing the lever $j$.

The cover H forms a protection to the cutter-cylinder, and, being hinged thereto, admits of turning upward when access is desired to the cutters for any purpose.

Having thus described our invention, what we claim as new, and desire to secure by Letters Patent, is—

The cutter-frame E, having bail M, arranged to operate in combination with rock-shaft J, curved arm L, ratchet $n''$, lever N, and with the wheel-frame A B, substantially as and for the purpose specified.

THOMAS W. PAGE.
MARTIN HOFFMAN.

Witnesses:
H. G. HOFFMAN,
C. D. HOBLITT.